United States Patent [19]

Mizutani

[11] Patent Number: 4,990,010
[45] Date of Patent: Feb. 5, 1991

[54] PAPER FEED TRACTOR WITH FIXED AND PIVOTABLE PRESSURE PLATES

[75] Inventor: Minoru Mizutani, Tokyo, Japan

[73] Assignee: Oki Electric Industry Co., Ltd., Tokyo, Japan

[21] Appl. No.: 302,321

[22] Filed: Jan. 27, 1989

[30] Foreign Application Priority Data

Jan. 29, 1988 [JP] Japan .................................. 63-16888

[51] Int. Cl.⁵ .............................................. B41J 11/34
[52] U.S. Cl. .................................. 400/616.2; 226/82; 400/613.1
[58] Field of Search .................. 400/613.1, 616, 616.1, 400/616.2, 616.3; 226/74, 82, 83, 84, 85

[56] References Cited

U.S. PATENT DOCUMENTS

| 3,490,668 | 1/1970 | Dean et al. | 226/74 |
| 3,669,327 | 6/1972 | Dowd | 400/616.2 |
| 3,938,721 | 2/1976 | Staneck et al. | 226/75 |

FOREIGN PATENT DOCUMENTS

| 3634033 | 4/1987 | Fed. Rep. of Germany. | |
| 67486 | 4/1983 | Japan | 400/616.1 |
| 72774 | 4/1985 | Japan | 400/616.1 |
| 1356505 | 6/1974 | United Kingdom | 226/82 |

*Primary Examiner*—David A. Wiecking
*Attorney, Agent, or Firm*—Wenderoth, Lind & Ponack

[57] ABSTRACT

A pin-tractor type paper feed mechanism is disclosed which includes feed belt with pins for feeding paper having perforations along the edges of the paper, the pins of the feed belt being engageable with the perforations of the paper. An endless film is provided between the top surface of the paper and a fixed first pressure plate so as to press against the top surface of the paper. A second fixed pressure plate is provided. The endless film and the feed belt are rotated in synchronism such that adjacent runs of the film and the belt advance in the same direction. As a result, no frictional force is applied to the top surface of the paper, and damage to the paper and improper feeding of the paper are prevented.

6 Claims, 4 Drawing Sheets 4,990,010

PAPER FEED TRACTOR WITH FIXED AND PIVOTABLE PRESSURE PLATES

BACKGROUND OF THE INVENTION

The present invention relates to a paper feed mechanism for a printer or the like for feeding paper which is used as a printing medium for the printer.

An example of a prior art paper feed mechanism for a printer or the like for feeding paper at a predetermined speed is a pin-tractor type mechanism such as shown in FIG. 1. This pin-tractor type mechanism comprises a drive pulley 11, a driven pulley 21, and a belt 4 trained about the two pulleys. Each of the pulleys 11, 21 includes pins 12 and 22 which engage with grooves 42 formed in the belt 4. Rotation of the drive pulley 11 causes rotation of the feed belt 4 in a predetermined direction. The drive pulley 11 is rotated by a drive shaft 1, and the driven pulley 21 is fitted on a support shaft 2 which supports the feed belt 4 with a predetermined tension. Provided at a predetermined interval on the outer surface of the feed belt 4 are pins 41. The pins 41 are engaged with perforations 91 formed linearly along both edges of printing paper 9 which often consists of several sheets stacked together. The paper 9 is therefore fed in the same direction as and in synchronism with the rotation of the feed belt 4.

A pressure plate 60 is provided over the paper 9 to ensure the engagement of the pins 41 with the perforation 91, i.e., to prevent disengagement of the pins 41 from the perforations 91 due, for example, to warping of the paper 9. By virtue of the pressure plate 60, the paper 9 is pressed against the feed belt 4 and is fed out while being pressed.

In the pin-tractor type feed mechanism described above, when the paper 9 is fed in synchronism with the rotation of the feed belt 4, a frictional force is created between the top surface of the paper and the pressure plate 60. The friction applies a reactive force on the top surface of the paper 9 in the direction opposite to the direction of feeding. When the speed of the feeding by the feed belt 4 is increased, the frictional force also is increased. Where stack of sheets of the paper 9 are fed, the top sheet of the paper 9 may have its perforations 91 disengaged from the pins 41, and may become incapable of being fed. This may result in damage to the perforations and faint printing on the paper.

SUMMARY OF THE INVENTION

An object of the invention is to solve the problems described above.

Another object of the invention is to provide a paper feed mechanism which can prevent disengagement of the perforations in the paper from the pins on the feed belt and to thereby avoid failure in the feeding process.

Another object of the invention is to prevent the perforations of the printing paper from becoming damaged, and the problem of faint printing.

A paper feed mechanism according to the invention includes a pressure plate with an endless film which contacts the top surface of the printing paper and is rotated in the same direction with and in synchronism with the feed belt, such that the paper engaged with the feed belt is fed while being pressed against by the endless film.

The endless film rotates in the same direction as and in synchronism with the feed belt so that no frictional force is created between the endless film and the paper. Moreover, the use of the endless film, which is pressed against by part of the pressure plate, to press against the paper results in improved engagement between the perforations and the pin such that disengagement of the perforations of the paper from the pins of the feed belt is avoided.

Although friction can occur between the endless film and the pressure plate, the material (and the structure of the endless film can be chosen so that the endless film can be made strong enough to withstand the friction.

DETAILED DESCRIPTION OF THE EMBODIMENTS

Figure 1:
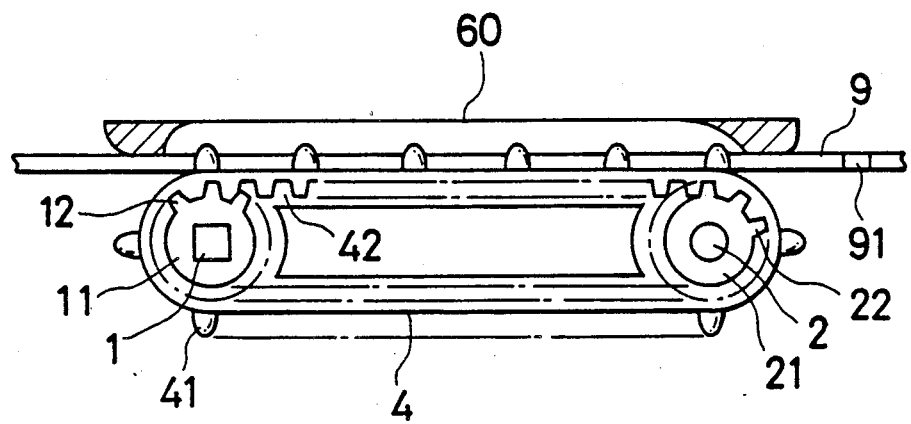
FIG. 1 is a schematic side view showing a prior art paper feed mechanism.

In the following description, parts and members identical or similar to those in the prior art shown in FIG. 1 are given the same reference numerals and further explanation thereof is omitted.

Figure 2:
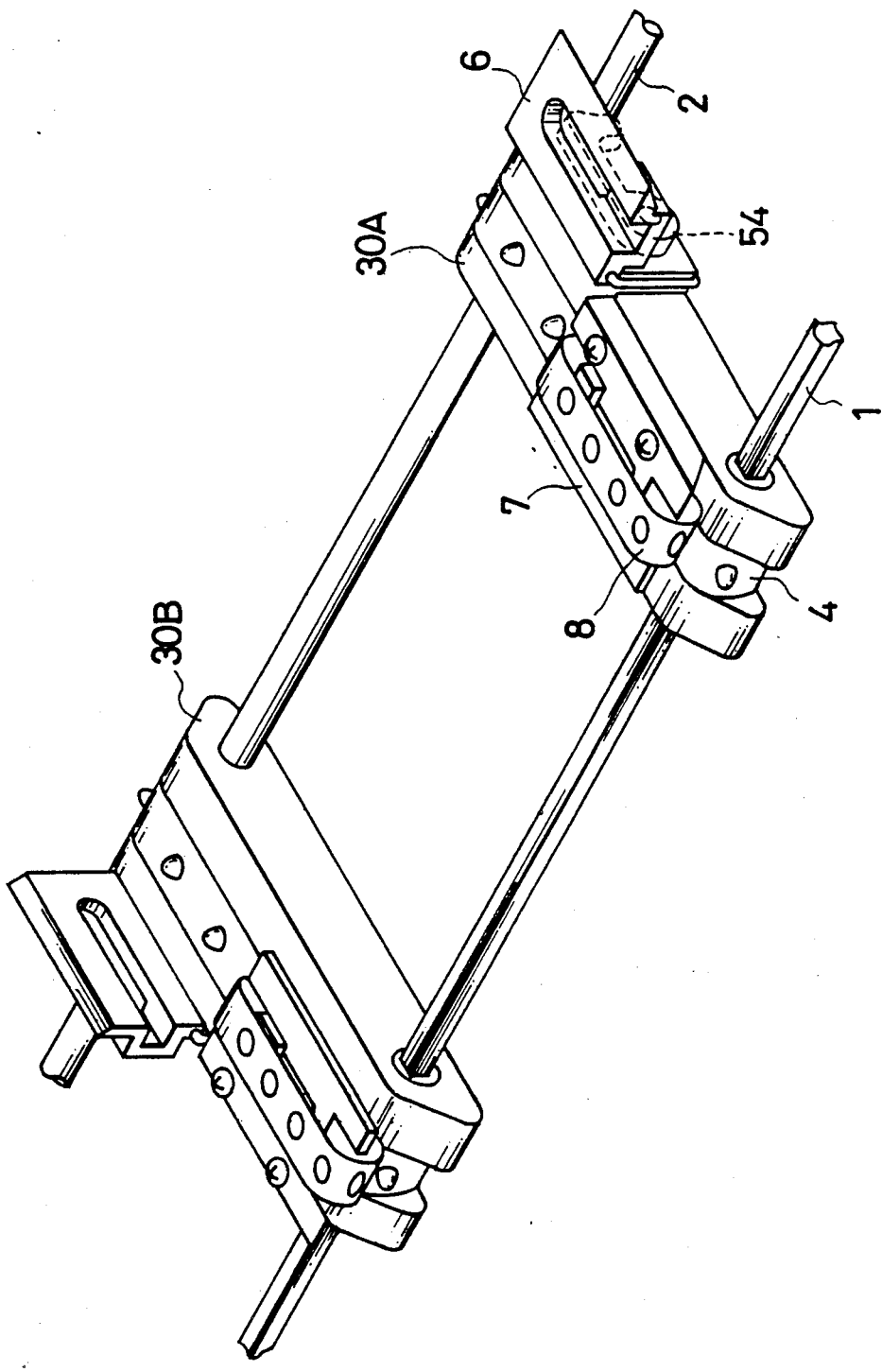
FIG. 2 is a perspective view showing a paper feed mechanism according to the invention.

FIG. 2 is a perspective view of a paper feed device comprising a paper feed mechanism according to the invention. The paper feed mechanism includes a pair of pin-tractors 30A and 30B supported by a drive shaft 1 and a support shaft 2. The pin-tractors 30A and 30B are identical to one another and are symmetrically disposed about an axis midway between them. To simplify the description, the following explanation is made only in connection with pin-tractors 30A, but it should be understood that the same explanation applies to the other pin tractor 30B.

Figure 3:
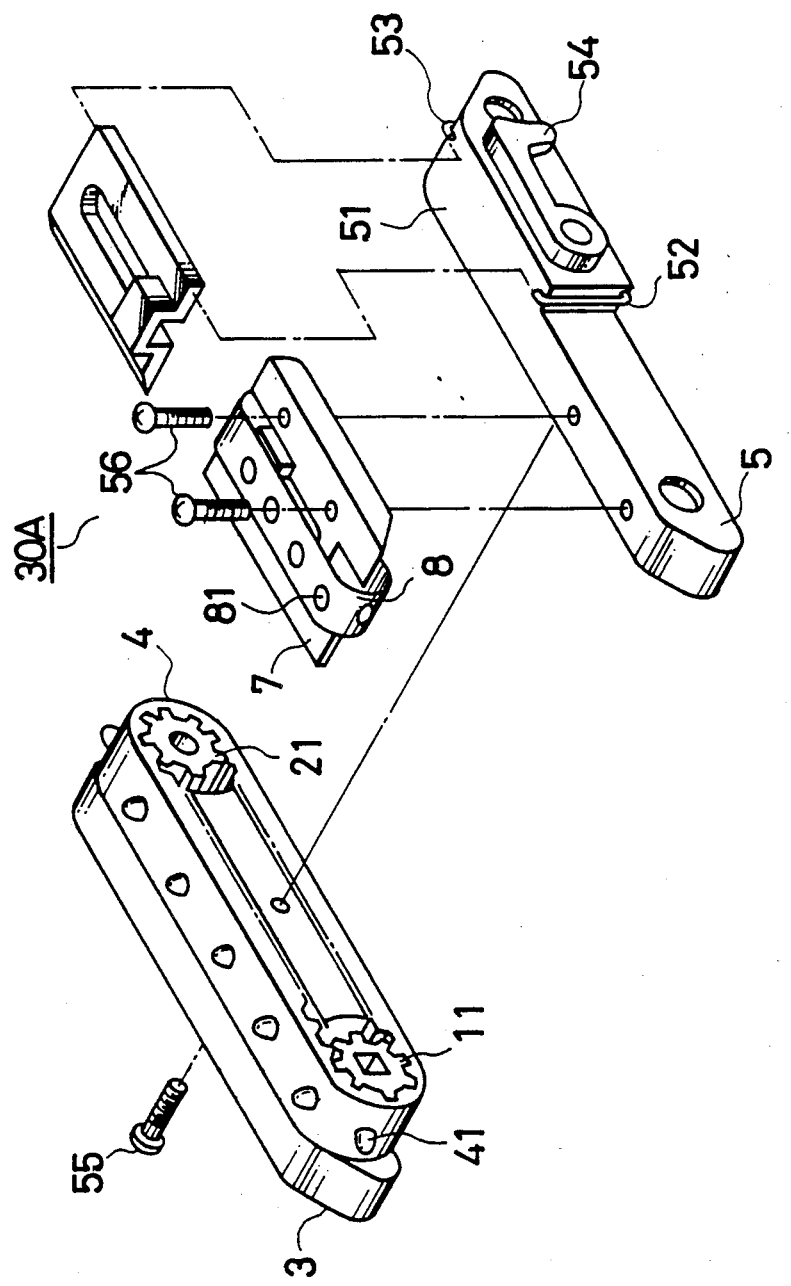
FIG. 3 is an exploded view of the paper feed mechanism according to the invention.

FIG. 3 is an exploded perspective view of the pin tractor 30A. Side frames 3 and 5 extend parallel with each other and are connected together by means of a bolt 55. A drive pulley 11 and a driven pulley 21 are rotatably supported in a predetermined spaced apart relation by the side frame 3 such that they are disposed between the side frames 3 and 5. A feed belt 4 is trained about the pulleys 11, 21. As shown by a schematic side view in FIG. 5, pins 12 project radially outwardly from the outer surface of the drive pulley 11 and pins 22 project radially outwardly from the outer surface of the driven pulley 21. The pins 12, 22 are engaged with grooves 42 formed laterally across the inner surface of the feed belt 4 at an interval corresponding to the pitch of the pins 12 and 22 on the pulleys 11 and 21. The drive pulley 11 is mounted on the drive shaft 1 which is rotated by means of a drive source, not shown, in a predetermined direction indicated by arrow FR.

The driven pulley 21 is slidably mounted on the support shaft 2 and supports the feed belt 4 while applying a certain, predetermined tension to the feed belt 4.

The feed belt 4 has pins 41 projecting outwardly from the outer surface thereof along both edges thereof at a predetermined interval. The pins 41 are slightly smaller in diameter than perforations 91 formed in the paper 9 which will be described later. The interval of the pins 41 is identical to the interval of the perforations 91 in the paper 9.

A first pressure plate 7 and a second pressure plate 6 are provided above the upper surface 51 of the side frame 5. The pressure plate 6 is on the upstream side (the side from which the paper 9 is fed), and the pressure plate 7 is on the downstream side (the side toward which the paper 9 is fed). The pressure plate 6 on the upstream side is mounted to the side frame 5 by means of a spring 52 and a pin 53 such that it can be opened outwardly (away from the opposite pin tractor 30B) to permit setting of the front end of the paper 9 on the side frames 3 and 5 and the feed belt 4. The pressure plate 7 on the downstream side is fixed by means of screws 56 to the upper surface 51 of the side frame 5.

An endless film 8 which is rotated with the feed belt 4 is provided in the center of the pressure plate 7.

Figure 4:
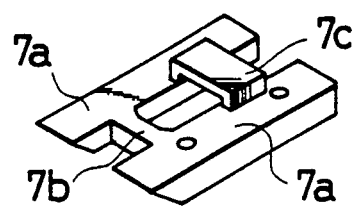
FIG. 4 is a perspective view of a downstream side pressure plate according to the invention.

The pressure plate 7 is shown in FIG. 4 with the endless film removed. As illustrated, the pressure plate 7 is formed of two parallel skids 7a, a spanning part 7b connecting the skids 7a to one another, and a bridge part 7c also connecting the two skids 7a to one another. The lower surface (best seen in FIG. 5) of the spanning part 7b serves to provide a reactive pressing force against the endless film 8.

The endless film 8 is preferably made of synthetic resin, such as polyester or polyimide. The thickness of the endless film 8 should be, for example, 0.2 mm to 0.5 mm when the length of the endless film is about 20 cm. The endless film 8 should preferably have a low coefficient of friction with the pressure plate 7. A plurality of perforations 81 are provided along the length of the endless film. The perforations 81 have a slightly larger diameter than the pins 41 and are provided at an interval substantially identical to the interval of the pins 41. Moreover, the pins 41 on the feed belt 4 are long enough so that their tips can project above the top surface of the paper 9, at least when the paper 9 consisting of stacked sheets is compressed. Accordingly, the perforations 81 of the endless film 8 are engaged with the pins 41 of the feed belt 4. Because the pins 41 are engaged with the perforations 8, the endless film 8 is advanced in the direction of advancement of the feed belt 4. The pins 41 also serve to "guide" the endless film 8 to prevent the endless film 8 from deviating laterally. The endless film 8 should have a certain stiffness so that it can apply a certain pressure in the downward direction against the paper 9. At the downstream end of the feed belt 4, the feed belt 4 advances downwardly about the drive pulley 11 such that the perforations 81 of the endless film 8 are automatically released from the pins 41.

Figure 5:
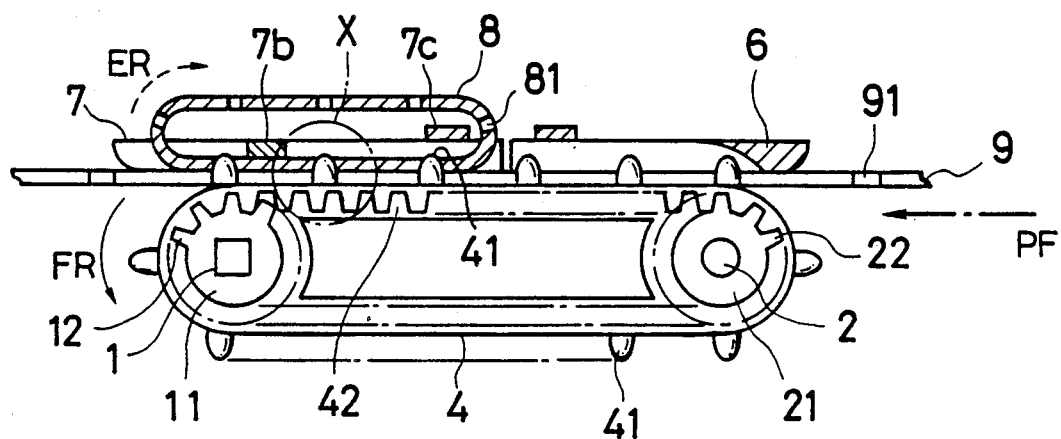
FIG. 5 is a schematic side view of the paper feed mechanism of FIG. 2.

When the feed belt 4 is rotated by the drive pulley 11 in the direction of the arrow FR in FIG. 5, the endless film 8 is rotated in synchronism therewith, in the direction of the arrow ER.

The situation where a plurality of sheets of paper are fed by means of the paper feed mechanism of the above structure will now be described. Typically the number of sheets in the stack of paper is 5 to 12, and the thickness of the stack of sheets is 0.9 mm to 1.8 mm in a non-compressed state, while it is 0.3 mm to 0.6 mm when the stack is compressed. The gap between the endless film 8 and the feed belt 4 is set at 0.6 mm to 1.0 mm.

Figure 6:
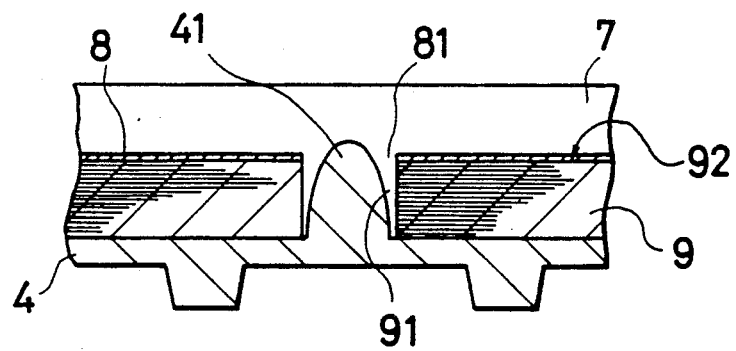
FIG. 6 is an enlarged view of portion X of FIG. 5.

First, a lock lever 54 (shown in FIG. 2) is released and either of the pin tractors 30A and 30B is slid along the support shaft 2 and positioned so that the separation between the tractors 30A and 30B is such that the pins 41 are spaced apart the same amount as the perforations 91 in the paper, i.e. the distance between the perforations 91 of the paper and the lock lever 54 is always the same. Then, the pressure plate 6 on the upstream side is opened outwardly, and the paper 9 is set so that its front part is placed on the upstream side of the upper surface 51 of the side frames 3 and 5. The pins 41 of the feed belt 4 that are now exposed because of the pressure plate 6 being opened outwardly and the perforations 91 of the paper 9 are engaged with one another. Next, the pressure plate 6 is closed, and the drive shaft 1 is rotated by a drive source, not shown. Then, as shown in FIG. 5, the feed belt 4 is rotated in the direction of the arrow FR and the paper 9 is fed in the direction of the arrow PF beneath the lower surface of the downstream side pressure plate 7. At the pressure plate 7, the perforations 81 of the endless film 8 are sequentially engaged with the pins 41 that are also engaged with the perforations 91 of the paper 9 and protrude above the perforations 91 of the paper 9. That is, as is more clearly illustrated in FIG. 6, which is an enlarged view of the portion X of FIG. 5, the endless film 8 passes between the top surface 92 of the paper 9 and the pressure plate 7 such that the endless film 8 is in contact with the top surface 92 of the paper 9. Because the endless film 8 is rotated in synchronism with the feed belt 4, as described above, substantially no frictional force is created between the top surface 92 of the paper 9 and the endless film 8. Accordingly, the top surface 92 of the paper 9 is pressed downwardly by the endless film 8 (as a reaction to the upward pressure from the paper 9), such that the perforations 91 of the paper 9 will not be disengaged from the pins 41 during rotation and the paper 9 will be smoothly fed out. Although friction is present between the endless film 8 and the pressure plate 7, the frictional force is smaller than that which would be present between the paper 9 and the pressure plate 7 because the coefficient of friction of the endless film 8 is smaller. The endless film can be made sufficiently strong to withstand this frictional force. In the above embodiment, the endless film is made of synthetic resin. Alternatively, the endless film may be formed of a thin metal film or the like.

In the above embodiment, a pair of pressure plates, one on the upstream side and the other on the downstream side, are used. The invention is not limited to this configuration. The endless film may be provided on a unitary pressure plate which may extend over the full length of the side frames 3 and 5. In this case, the entire pressure plate should be openable for permitting the paper to be mounted therein.

As has been described, in the paper feed mechanism according to the invention, an endless film which is pulled by the pins on the feed belt so as to be rotated in the same direction as and in synchronism with the feed belt is provided to rotate around the pressure plate. Because the top surface 92 of the paper 9 is pressed by the endless film such that no frictional force acts against the top surface of the paper, the perforations of the paper will not be disengaged from the pins on the feed belt and a plurality of sheets of the paper can be fed reliably. This prevents damage to the perforations of the paper and faint printing on the paper. Moreover, the mechanism can be used at high operating speeds.

What is claimed is:

1. A paper feed mechanism for feeding paper having perforations formed therein at even intervals linearly along a feeding direction of the paper, comprising:
   a side frame;
   a drive pulley mounted to said side frame and adapted to be driven to rotate about a first axis;
   a driven pulley mounted to said side frame for rotation about a second axis, said second axis being parallel to said first axis;
   an endless feed belt trained about said drive pulley and said driven pulley so as to be rotated in an endless path about said drive pulley and said driven pulley upon rotation of said drive pulley, said feed belt having pins projecting outwardly therefrom at even intervals linearly along the feeding direction, said even intervals of said pins corresponding to the even intervals of the perforations of the paper such that said pins are engageable with the perforations;
   a first pressure plate mounted in a fixed position to said side frame in overlying relation to said feed belt at a downstream end of said side frame with respect to the feeding direction of the paper.
   a second pressure plate pivotably mounted to said side frame at an upstream end thereof for movement between a closed first position in which said second pressure plate overlies said feed belt and is adapted to press the paper against the belt, and an open second position which allows the paper to be loaded such that the perforations of the paper are engaged with said pins of said feed belt; and
   an endless film, mounted for rotation about said first pressure plate, having perforations formed therein at even intervals linearly along the feeding direction of the paper, said even intervals of said perforations of said endless film corresponding to said even intervals of said pins of said feed belt and said perforations of said endless film being engaged with said pins of said feed belt such that rotation of said feed belt causes rotation of said endless film, and such that when the perforations of the paper are engage with said pins of said feed belt, the paper is disposed between said endless film and said feed belt.

2. A paper feed mechanism as recited in claim 1, wherein
   said endless film is of a stiffness sufficient to cause its perforations to disengage from said pins of said feed belt at a downstream location of said feed belt where said feed belt curves about said drive pulley.

3. A paper feed mechanism as recited in claim 1, wherein
   said first pressure plate includes a part which contacts and applies pressure against said endless film, such that the endless film can apply pressure against the paper.

4. A paper feed mechanism as recited in claim 1, wherein
   said first pressure plate is fixed to said side frame by at least one screw.

5. A paper feed mechanism as recited in claim 1, wherein
   said first pressure plate has a recess to permit passage of said pins of said feed belt as said feed belt is rotated.

6. A paper feed mechanism as recited in claim 1, wherein
   said first and second pressure plates are mounted such that an upstream end of said first pressure plate is disposed closely adjacent to a downstream end of said second pressure plate, such that when the paper is fed from between said second pressure plate sand said feed belt, the paper is fed between said feed belt and said endless film.

* * * * *